(12) United States Patent
Sheehan et al.

(10) Patent No.: US 7,534,837 B2
(45) Date of Patent: May 19, 2009

(54) RANDOM COPOLYMERS OF ETHYLENE AND 4-VINYLPHENYL ESTERS AND METHOD FOR PREPARING THE SAME

(75) Inventors: Michael Thomas Sheehan, Corpus Christi, TX (US); Mark E. Wagman, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/235,300

(22) Filed: Sep. 26, 2005

(65) Prior Publication Data
US 2007/0073003 A1 Mar. 29, 2007

(51) Int. Cl.
C08F 226/06 (2006.01)
C08F 16/18 (2006.01)

(52) U.S. Cl. ............... 525/327.1; 525/328.9; 525/329.5; 525/329.7; 525/330.1; 525/327.7; 526/319

(58) Field of Classification Search ............... 525/327.1, 525/327.7, 328.9, 329.5, 329.7, 330.1; 526/319
See application file for complete search history.

(56) References Cited

U.S. PATENT DOCUMENTS

| | | | |
|---|---|---|---|
| 2,402,137 A | 6/1946 | Hanford et al. | |
| 2,683,141 A | 7/1954 | Erchak, Jr. | |
| 2,713,071 A | 7/1955 | Erchak, Jr. | |
| 2,932,632 A | 4/1960 | Barry et al. | |
| 3,993,714 A | 11/1976 | Kanagawa et al. | |
| 4,039,630 A | 8/1977 | Kanagawa et al. | |
| 4,182,803 A | 1/1980 | Kanagawa et al. | |
| 4,351,931 A | 9/1982 | Armitage | |
| 4,748,209 A | 5/1988 | Orikasa et al. | |
| 4,880,487 A | 11/1989 | Sheehan et al. | |
| 5,254,619 A * | 10/1993 | Ando | 524/504 |
| 5,281,636 A * | 1/1994 | Nambu et al. | 524/378 |
| 5,525,457 A * | 6/1996 | Nemoto et al. | 430/325 |
| 6,001,532 A | 12/1999 | Taylor, Jr. et al. | |
| 6,368,677 B2 | 4/2002 | Hubbard et al. | |
| 6,759,483 B2 | 7/2004 | Sheehan et al. | |
| 6,787,611 B2 * | 9/2004 | Sheehan | 525/327.4 |
| 2005/0142488 A1 * | 6/2005 | Sheehan et al. | 430/270.1 |
| 2005/0267262 A1 | 12/2005 | Wagman et al. | |

FOREIGN PATENT DOCUMENTS

| | | |
|---|---|---|
| CA | 536825 A | 2/1957 |
| JP | 06009373 | 8/1995 |
| JP | 07216330 A * | 8/1995 |

OTHER PUBLICATIONS

U.S. Appl. No. 11/135,861, filed May 20, 2005, Wagman et al.
Samoilov, S. M., Propylene Radical Copolymerization, J. Macromol. Sci.—Rev. Macromol. Chem., 1981, pp. 333-337; 354-355; 358-359; 386-393, C(20)2.

* cited by examiner

*Primary Examiner*—Ling-Siu Choi
*Assistant Examiner*—Michael M Bernshteyn

(57) ABSTRACT

The invention discloses a composition consisting essentially of an E/X/M random copolymer wherein X is from 0.1 to 20 mol % of the E/X/M copolymer and is a 4-vinylphenyl ester, preferably 4-acetoxystyrene; M is from 0 to 40 mol % of the E/X/M copolymer and is one or more ethylenically unsaturated monomers; and E is ethylene. The invention further encompasses a high pressure radical polymerization process for providing the novel polymers; and a base catalyzed transesterification process for conversion of the E/X/M copolymer to an E/Y/M copolymer wherein Y is derived from 4-hydroxystyrene. Another embodiment of the invention is a composition consisting essentially of an E/Y/M random copolymer wherein Y is greater than 1.0 to about 20 mol % of the E/Y/M copolymer and is 4-hydroxystyrene; M is from 0 to 40 mol % of the E/Y/M copolymer and is one or more ethylenically unsaturated monomers; and E is ethylene.

4 Claims, No Drawings

RANDOM COPOLYMERS OF ETHYLENE AND 4-VINYLPHENYL ESTERS AND METHOD FOR PREPARING THE SAME

FIELD OF INVENTION

The invention relates to the field of polymer chemistry. More specifically, the invention relates to new random copolymer compositions derived from radical polymerization of 4-vinyl phenyl esters such as 4-acetoxystyrene with ethylene. The invention further relates to the conversion of the copolymers to the corresponding hydroxyl copolymers by ester cleavage.

BACKGROUND OF INVENTION

Poly(p-hydroxy)styrenes, linear or branched, are available commercially and known in the art. For instance, U.S. Pat. No. 4,898,916 discloses the preparation of poly(vinylphenol) from poly(acetoxystyrene). U.S. Pat. No. 6,368,677, Hubbard et al, discloses a method for providing a waterborne, barrier coating to a polyolefin substrate. The method involves applying to the substrate a primer composition containing a commercial vinyl polymer derived from p-hydroxystyrene, wherein at least 75% of the polymer repeat units contain side groups having hydroxyl moieties. However, it would be desirable to have a polymer composition wherein the 4-acetoxystyrene, or an alkyl homolog, is incorporated at a low mol % as a random copolymer in a conventional thermoplastic polyolefin such as polyethylene. The presence of 4-acetoxystyrene or its hydrolyzed or transesterified form, 4-hydroxysytrene, may impart adhesive and compatibilizer properties not readily available in traditional polyolefin-based polymers. Such random modification to a polyethylene polymer should make these copolymers useful in a number of applications, including adhesion promoters, compatibilizers, and separation media.

Unexamined patent publication JP 1995220725 A discloses a copolymer of 70-99.99 mol % of aliphatic hydrocarbons monomers and ethylenically unsaturated monomers containing one or two carboxyl groups, anhydride or hydroxyl groups. A copolymer comprising 47.5 mol % ethylene, 47.5 mol % propylene and 5 mol % 4-hydroxystyrene is disclosed in Table 2 of the reference.

U.S. Pat. No. 4,748,209, Orikasa, et al, discloses a random copolymer of a styrene series monomer (including hydroxystyrene) and ethylene, wherein the content of the styrene monomer is within the range of 0.01 to 1.0 mol % (see, Col. 2, lines 63-68).

U.S. Pat. No. 4,182,803 and related U.S. Pat. No. 3,993,714, Kanagawa, et al, disclose a modified elastomer having a phenolic hydroxyl group on the side chain, obtained by copolymerizing at least one monomer selected from the group consisting of conjugated dienes, and monoethylenically unsaturated monomers, with a phenolic monomer including 3-hydroxystyrene and alkyl derivatives thereof. The disclosed group of polymers derived from monoethylenically unsaturated monomers includes monoolefins including ethylene. However, no copolymers specifically derived from the polymerization of ethylene and 3-hydroxystyrene or 4-hydroxystyrene are disclosed.

U.S. Pat. No. 6,001,532, Taylor, et al, disclose in claim 12 an organic layer comprising: structured block or random polymers prepared from at least one substituted styrene, including p-hydroxystyrene, and at least one other monomer, including ethylene. However, no copolymers specifically derived from the polymerization of ethylene and 3-hydroxystyrene or 4-hydroxystyrene are disclosed.

U.S. Pat. No. 4,039,630, Kanagawa, et al, discloses a modified elastomer having a phenolic hydroxyl group obtained by graft-copolymerizing an elastomer (derived from polymerization of ethylene, an α-olefin and at least one non-conjugated diene or polyene) with at least one vinyl phenolic monomer.

U.S. Pat. No. 6,759,483, Sheehan, et al, discloses a one-pot process for the preparation of homo-, co- and terpolymers of p-hydroxystyrene and alkyl acrylates. The process involves the polymerization of esters of p-hydroxystyrene, alkyl acrylates monomers and/or one or more of ethylenically unsaturated monomers in an alcohol solvent in the presence of a radical initiator. The so formed polymer is subjected to transesterification conditions using a catalytic amount of catalyst to provide co- and/or terpolymers of p-hydroxystyrene without cleavage of the alkyl ester in the acrylate repeat unit. This process is restricted to low pressure polymerizations, not compatible with the polymerization of ethylene copolymers.

Commonly owned U.S. patent application Ser. No. 11/135861 entitled "Method for making polyolefin graft polymers having improved adhesion properties" discloses the solution grafting of polyolefin polymers by grafting phenolic esters monomers, e.g. 4-acetoxystyrene, in the presence of radical initiator. The graft polymers provide useful adhesion promoters and compatibilizers. However, a polyolefin composition wherein the 4-acetoxystyrene was incorporated at a low mol % as a random copolymer, rather than a graft polymer, would be desirable.

SUMMARY OF INVENTION

One embodiment of the Invention is a composition consisting essentially of an E/X/M random copolymer wherein: X is from 0.1 to 20 mol % of the E/X/M copolymer and is selected from the formula (I)

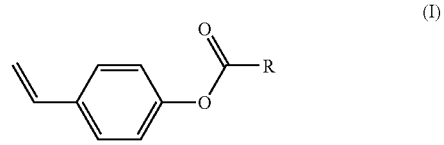

wherein: R is a C1 to C20 straight or branched chain alkyl group, or phenyl; M is from 0 to 40 mol % of the E/X/M copolymer and is one or more monomers selected from the group consisting of: vinyl acetate, alkyl (meth)acrylic esters, acrylonitrile, maleic anhydride, maleic acid diesters, (meth)acrylic acids, maleic acid, maleic acid monoester, itaconic acid fumaric acid, fumaric acid monoesters, glycidyl acrylate, glycidyl methacrylate, and glycidyl vinyl ether; and E is ethylene and is the remainder mol %.

Another embodiment of the invention is a process for providing the E/X/M random copolymer comprising high pressure radical polymerization of the E/X/M monomer mixture.

Another embodiment of the invention is a composition consisting essentially of an E/Y/M random copolymer wherein: Y is greater than 1.0 to about 20 mol % of the E/Y/M copolymer and is 4-hydroxystyrene; M is from 0 to 40 mol % of the E/Y/M copolymer and is one or more monomers selected from the group consisting of: vinyl acetate, alkyl (meth)acrylic esters, acrylonitrile, maleic acid diesters, (meth)acrylic acids, maleicacid, maleic acid monoester, itaconic acid, fumauic acid, fumaric acid monoesters, glycidyl acrylate, glycidyl methacrylate, and glycidyl vinyl ether; and E is ethylene and is the remainder mol %.

Another embodiment of the invention is a process for providing an E/Y/M random copolymer of the invention wherein: Y is from 0.1 to 20 mol % of the E/Y/M copolymer and is 4-hydroxystyrene; M is from 0 to 40 mol % of the E/Y/M copolymer and is one or more monomers selected from the group consisting of: vinyl acetate, alkyl(meth) acrylic esters, acrylonitrile, maleic acid diesters, (meth) acrylic acids, maleic acid, maleic acid monoester, itaconic acid, fumaric acid, fumaric acid monoesters, glycidyl acrylate, glycidyl methacrylate, and glycidyl vinyl ether; and E is ethylene and is the remainder mol %; comprising the steps of: (a) providing an E/X/M random copolymer wherein: X is from 0.1 to 20 mol % of the E/X/M copolymer and is selected from the formula (I)

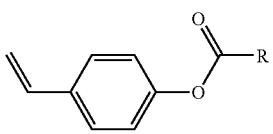
(I)

wherein R is a C1 to C20 straight or branched chain alkyl group, or phenyl; and (b) subjecting the E/X/M copolymer to transesterification conditions at reflux temperature in an alcohol solvent in the presence of catalytic amounts of an alkali metal alkoxide or hydroxide and a second nonhydroxylic solvent; to provide a reaction mixture; such that a transesterified by-product ester formed is continuously removed from the reaction mixture to provide said E/Y/M random copolymer.

DETAILED DESCRIPTION OF INVENTION

The term (meth)acrylate is meant to encompass acrylate and methacrylate monomers.

The term copolymer is meant to encompass polymers derived from two, three or more monomers.

The E/X/M random copolymers of the invention are addition polymers derived from radical polymerization of ethylenically unsaturated monomers. The ethylenically unsaturated monomers are E, representing ethylene; X, representing monomers of formula (I),

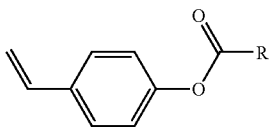

wherein R is a C1 to C20 straight or branched chain alkyl group or phenyl; and, optionally, M represents one or more monomers selected from the group: vinyl acetate, alkyl(meth) acrylic esters, acrylonitrile, maleic anhydride, maleic acid diesters, (meth)acrylic acids, maleic acid, maleic acid monoester, itaconic acid, fumaric acid, fumaric acid monoesters, glycidyl acrylate, glycidyl methacrylate, and glycidyl vinyl ether. In the invention, X is 0.1 to 20 mol %; M is from 0 to 40 mol %; and E is ethylene and is the remainder mol %. In a preferred embodiment M is absent, and the E/X/M random copolymer is a two component copolymer.

In a preferred embodiment, X is about 0.5 to about 12 mol % and M is 1 to 20 mol %. Preferably M is selected from the group: vinyl acetate and alkyl(meth)acrylic esters; and more preferably M is selected from the group: methyl(meth)acrylates, ethyl(meth)acrylates, and butyl (meth)acrylates.

Preferably X is 4-acetoxystyrene, sometimes referred to as 4-vinylphenyl acetate. The 4-vinyl phenyl esters of the invention may be synthesized by methods well known in the art. For example, the alkyl styrene esters may be prepared using the method described by Overberger (U.S. Pat. No. 2,687, 422, and J. Amer. Chem. Soc. 72:1200-1202 (1950)). The styrene ester wherein R=H (p-formylstyrene) may be prepared via the decarboxylation of p-formylcinnamic acid, as described by Wiley et al. (J. Amer. Chem. Soc. 71:2429-2431 (1949)). The styrene ester wherein R=phenyl, that is p-vinylphenyl benzoate may be prepared via the base-catalyzed addition of benzoyl chloride to p-hydroxystyrene, as described by Hattori et al. (J. Amer. Chem. Soc. 81:4424-4427 (1959)). 4-Acetoxystyrene is available commercially in high purity from companies such as DuPont Electronic Polymers (Dallas, Tex.), Aldrich (Milwaukee, Wis.), Lancaster Synthesis (Pelham, N.H.), and TCI America (Portland, Oreg.). 4-Acetoxystyrene may also be synthesized according to the method described by Corson et al. (J. Org. Chem. 23:544 (1958)); or using the method described by Sounik, et al, in U.S. Pat. No. 5,463,108.

The E/X/M random copolymers of the invention can be prepared by conventional methods for radical copolymerization of polyethylene copolymers, under high pressure, operating in a continuous manner. Ethylene, 4-vinylphenyl acetate and other optional monomers are fed into the reaction mixture in a proportion that relates to the monomer's reactivity and the amount to be incorporated. Unreacted monomers are removed and recycled. In this way, uniform, near-random distribution of monomer units along the chain is achieved. Polymerization in this manner is well known, and is described in U.S. Pat. No. 4,351,931, Armitage, and is hereby incorporated by reference.

The radical initiator may be any initiator that achieves the desired end result. The initiator may be selected from the group consisting of 2,2'-azobis (2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl)peroxydicarbonate, di(sec-butyl)peroxydicarbonate, di(2-ethylhexyl)peroxydicarbonate, t-butylperoxyneodecanoate, 2,5-dimethyl-2,5-di (2-ethylhexanoylperoxy)hexane, t-amylperoxyneodecanoate, dimethyl 2,2'-azobisisobutyrate and combinations thereof. Preferably the initiator is selected from the group consisting of 2,2'-azobis(2,4-dimethylpentanenitrile), 2,2'-azobis(2-methyl propanenitrile), 2,2'-azobis(2-methylbutanenitrile), 1,1'-azobis (cyclohexanecarbonitrile), di(sec-butyl)peroxydicarbonate, t-butyl peroxy-2-ethylhexanoate, t-butyl peroxypivalate, t-amyl peroxypivalate, and combinations thereof.

The polymerization is preferably carried out in a stirred autoclave, agitated at high rates such as 250 rpm and higher to maintain a constant environment. Ethylene, the other monomers, which may be dissolved in ethylene or another suitable solvent, and initiator, also dissolved in a suitable solvent, are injected into the autoclave. The agitator is started and the feed is continued until the desired pressure is reached, at which time a discharge valve is opened to maintain the desired pressure. The temperature of the reactants is then built up to the "light off" state by any suitable means, such as for example, by the use of a heating jacket surrounding the autoclave, the use of internal or external electrical type heaters or the like. At these pressures and temperatures the reagents exist as a uniform phase. "Light off" occurs when the temperature is reached at which the polymerization initiator begins to generate free radicals at an appreciable rate. The free radicals induce the polymerization of the monomers and since this reaction is exothermic, the temperature is observed to rise. When the temperature rises slightly the initiator produces free radicals at a faster rate and the exothermic polymerization of ethylene proceeds still faster. For this reason a marked temperature surge is observed as the reaction "lights off". Once "light off" is obtained, the application of heat through jackets into the reaction mixture and/or feed streams may be discontinued. The reaction temperature, within narrow limits, is then maintained by controlling the amount of exothermic polymerization which also maintains a definite monomer to polymer ratio within the autoclave. In accord with the type of polymer it is desired to produce, the temperature within the reactor is allowed to build up to the exact temperature that will produce that type of polymer. This is accomplished by regulating the rate at which the initiator is fed to the reactor. The exotherm of the reaction and, therefore, the molecular properties of the polymer desired are therefore controlled by the amount of heating applied to the feed streams and the amount of initiator introduced. The resulting polymer solution is passed through a pressure let-down valve into a vessel maintained at a substantially reduced pressure, as compared to the polymerization autoclave, and at a temperature well above the melting point of the polymer; in this vessel, every reagent except the polymer is flashed off. The polymer is isolated and cooled to room temperature.

Preferred polymers provided by the polymerization include: those wherein X is 4-acetoxystyrene; those wherein M is 0 mol % and the E/X/M random copolymer is a two component copolymer; those wherein X is about 0.5 to about 12 mol % of the E/X/M copolymer; those wherein M is about 1 to about 20 mol % of the E/X/M copolymer; and those wherein M is selected from the group consisting of: vinyl acetate and alkyl (meth)acrylic esters. Additionally, preferred polymers are further characterized by a melt flow index of 0.15 g/10 min to about 100 g/10 min as determined by ASTM method #D1238, condition 190/2.16; and, more preferably, by a melt flow index of 0.5 g/10 min to about 50 g/10 min.

Another embodiment of the invention is a process for preparing an E/X/M random copolymer by continuously charging ethylene, the monomers X and M, and a free radical initiator, selected from the group consisting of oxygen, peroxide and azo-bis compounds, into a single phase reaction zone stirred at a high rate and maintained at a preselected pressure of at least 1000 atmospheres of ethylene and at a preselected temperature maintained within narrow limits at a value between about 90° C. and about 280° C., the ratio of ethylene to monomers X and M charged being in the range of 10,000/1 to 50/1 by weight, and maintaining a definite monomer to polymer ratio in the reaction zone and regulating the concentration of initiator fed into the reactor at a predetermined value while allowing said monomer X, monomer M and ethylene to copolymerize in said reaction zone, and continuously removing from reactor a stream consisting of unreacted ethylene, unreacted monomers X and M, and the copolymer at a rate such that the reactor residence time permits conversion of 3 to 20% of the ethylene to polymer, through a pressure let-down valve to a zone maintained at substantially reduced pressure from which all reagents are flashed off leaving the copolymer product.

Preferred processes for preparing an E/X/M random copolymer include: one wherein the temperature is from about 150° C. to 240° C. and the pressure from 1500 to 3000 atmospheres; one wherein the initiator is a peroxide; one wherein X is about 0.5 to about 12 mol % of the E/X/M copolymer; one wherein M is about 1 to about 20 mol % of the E/X/M copolymer; and one wherein M is selected from the group of: vinyl acetate and alkyl(meth)acrylic esters.

Conversion of the E/X/M copolymers to E/Y/M copolymers can be accomplished by a variety of chemical methods. One preferred method is wherein the hydroxyl group is liberated by transesterification with an alcohol using a base catalyst. Conditions for such a conversion are disclosed in U.S. Pat. No. 6,759,483, hereby incorporated by reference. The E/X/M copolymer is dissolved or slurried in a suitable solvent, such as a lower alcohol. A catalytic amount of base, either alone or dissolved in a suitable alcohol such as methanol, is added and the mixture usually stirred, with heating if desired, to cleave the ester group. The procedure generally provides copolymers of 4-hydroxystyrene without cleavage of the alkyl esters in acrylate or other alkyl ester repeat unit.

Suitable solvents include, but are not limited to methanol, ethanol, n-butanol, tetrahydrofuran, dioxane, 2-methoxyethanol, 1,2-dimethoxyethane, and mixtures thereof and the like. When a non-hydrolytic solvent is used as solvent, the base is usually dissolved in an alcohol to provide a source of alcohol. Preferred nonhydroxylic solvents include tetrahydrofuran, dioxane and 1,2-dimethoxyethane.

The catalyst is such that it will not substantially react with said alkyl (meth)acrylate monomer or with said co-polymerizable monomers. The catalyst is selected from the group consisting of ammonia, lithium methoxide, lithium ethoxide, lithium isopropoxide, sodium methoxide, sodium ethoxide, sodium isopropoxide, potassium methoxide, potassium ethoxide, potassium isopropoxide, cesium methoxide, cesium ethoxide, cesium isopropoxide, and combinations thereof, wherein the alkoxide anion is similar to the alcohol solvent. It is also understood that the catalyst can be alkali metal hydroxides such as lithium hydroxide, sodium hydroxide, potassium hydroxide, cesium hydroxide and combinations thereof. The amount of catalyst employed is from about 0.1 mole percent to about 10 mole percent of 4-vinylphenyl ester present in the composition of said polymer. In cases where M is an acid monomer such as acrylic acid, sufficient base can be added to neutralize the acid and act as a catalyst. Alternatively, acid catalyzed transesterification may be used as discussed below. In a preferred embodiment, the catalyst is added as a solution in an alcohol solvent. The temperature of the transesterification is such that the transesterified by-product ester formed can be continually removed from the reaction mixture. Such temperatures can be from about 50° C. to about 200° C. In a preferred embodiment, the transesterification reaction is carried out at reflux temperature of the alcohol solvent.

A preferred process of the invention is subjecting the E/X/M copolymer to transesterification conditions at reflux temperature in an alcohol solvent in the presence of catalytic amounts of an alkali metal alkoxide or hydroxide and a second nonhydroxylic solvent; such that a transesterified by-product ester formed is continuously removed from the reaction mixture to form said E/Y/M random copolymer. Preferably, the alcohol solvent is methanol, the alkali metal alkoxide is sodium methoxide, and the second solvent is tetrahydrofuran. Preferably, About 1 to about 10 mol % of alkali metal alkoxide is used as a catalyst, based on the mol % of X in the E/X/M copolymer. Preferably the second nonhydroxylic solvent and the alcohol solvent are in a ratio of about 10:1 to about 300:1 by weight. This preferred process is especially important for transesterification of E/X/M copolymers that have low solubility in the lower alcohols.

Alternative methods can be used to convert E/X/M copolymers to E/Y/M copolymers. For instance, U.S. Pat. No. 4,898,916 discloses a process for the preparation of poly(vinylphenol) from polymers of 4-acetoxysytrene by acid catalyzed transesterification. U.S. Pat. No. 4,678,843 discloses a similar process for ammonia hydrolysis of polymers of 4-acetoxysytrene to polymers of vinylphenol and U.S. Pat. No. 4,192,173 discloses a similar process in aqueous suspension with nitrogen bases. All of these methods are hereby incorporated by reference.

Preferred embodiments of the invention Include E/Y/M random copolymers wherein Y is 4-hydroxystyrene; those wherein M is 0 mol % and the E/Y/M random copolymer is a two component copolymer; those wherein Y is about 0.5 to about 12 mol % of the E/Y/M copolymer; those wherein M is about 1 to about 20 mol % of the E/Y/M copolymer; and those wherein M is selected from the group consisting of: vinyl acetate and alkyl (meth)acrylic esters. Additionally, preferred polymers are further characterized by a melt flow index of 0.15 g/10 min to about 100 g/10 min as determined by ASTM method #D1238, condition 190/2.16; and, more preferably, by a melt flow index of 0.5 g/10 min to about 50 g/10 min.

The E/Y/M random copolymers of the invention are useful as adhesion promoters as indicated by the peel strength measurements in the examples for common polar substrates.

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

EXAMPLE 1

This example illustrates the production of a random E/X/M copolymer of ethylene and 4-acetoxystyrene by high pressure free radical polymerization.

The polymerization was conducted in a high pressure reactor at a pressure of 27,000 psi ($1.86 \times 10^8$ Pascals) and a temperature of 180° C. in the presence of an initiator and telogen. Ethylene was fed at a rate of 25 lb/hr and 4-acetoxystyrene was fed at a rate of 0.26 lb/hr. The polymerization was conducted in the presence of 20 vol % di(sec-butyl)peroxydicarbonate (PDC) in odorless mineral spirits as a free radical initiator, and 3.3-3.5 lb/hr propane as a telogen. The temperature of the polymerization was controlled by a feed back loop that controlled the amount of initiator added. Under these conditions, polymer was produced at an average rate of 2.9 lb/hr.

Polymer states were collected each hour over a total of 17 hours. Six of the states prepared under similar level conditions were combined and ground, blended well and dried in a vacuum oven at 50° C., for approximately 24 hrs, providing 16.8 lbs. of off-white polymer. The polymer had a melt index of 6.3 g/10 min, a DSC melting point of 112.3° C., and a heat of fusion of 131.8 J/g. By GPC, the polymer $M_w$ was approximately 145,000. The $^1$H NMR spectrum exhibited a composition of 94.5 wt % ethylene, 5.0 wt % ASM and 0.4 wt % other, assayed as n-butyl acrylate. The $^{13}$C NMR exhibited only isolated ASM in the polymer chain. There were no dyads or triads detected, indicating that the product is a random copolymer and not a mixture of homopolymers.

EXAMPLE 2

This example illustrates production of a random E/X/M copolymer of ethylene and greater than 10 wt % 4-acetoxystyrene by high pressure radical polymerization.

The polymerization was conducted in a high pressure reactor at a pressure of 27,000 psi ($1.86 \times 10^8$ Pascals) and a temperature of 180° C. Ethylene was fed at a rate of 25 lb/hr and ASM was fed at a rate of 0.65 lb/hr. The polymerization was conducted in the presence of 60 vol % PDC in odorless mineral spirits, as a free radical initiator. Under these conditions, polymer was produced at an average rate of 2.7 lb/hr.

Polymer states were collected each hour over a total of 22 hours. Six of the states prepared under similar level conditions were combined and ground, blended well and dried in a vacuum oven at 50° C., for approximately 24 hrs, yielding 16.0 lbs. of off-white polymer. The polymer had a melt index of 42.0 g/10 min, a DSC melting point of 105.1° C. and a heat of fusion of 95.4 J/g. By GPC, the polymer $M_w$ was approximately 87,000. By $^1$H NMR, the polymer exhibited a composition of 85.5 wt % ethylene, 13.0 wt % 4-acetoxystyrene and 1.4 wt % other, assayed as n-butyl acrylate. By $^{13}$C NMR, the ratio of isolated to dyad to triad sequences of 4-acetoxystyrene was 67% to 24% to 9%, which is consistent with an essentially random copolymer.

EXAMPLE 3

This example illustrates formation of a random E/X/M copolymer of ethylene, 4-acetoxystyrene, and n-butyl acrylate (nBA) by high pressure free radical polymerization.

The polymerization was conducted in a high pressure reactor at a pressure of 27,000 psi ($1.86 \times 10^8$ Pascals) and a temperature of 180° C. Ethylene was fed at a rate of 25 lb/hr, 4-acetoxystyrene was fed at a rate of 0.29 lb/hr, and nBA was fed at a rate of 0.6 lb/hr. The polymerization was conducted in the presence of 30 vol % PDC in odorless mineral spirits, as a free radical initiator and 2.0 lb/hr propane as a telogen. Under these conditions, polymer was produced at an average rate of 3.1 lb/hr.

Polymer states were collected each hour over a total of 8 hours. Five of the states prepared under similar level conditions were combined and ground, blended well and dried in a vacuum oven at 50° C., for approximately 24 hrs, yielding 15.5 lbs. of off-white polymer. The polymer had a melt index of 6.8 g/10 min, multiple DSC melting points at 49.6, 65.3, and 92.6° C. and a total heat of fusion of 77.1 J/g. By GPC, the polymer $M_w$ was approximately 176,000. By $^1$H NMR, the polymer exhibited a composition of 80.6 wt % ethylene, 5.3 wt % 4-acetoxystyrene and 14.1 wt % nBA. By $^{13}$C NMR, mainly isolated 4-acetoxystyrene was found in the polymer chain, with a possible trace of dyads, indicating that the product is a random copolymer and not a mixture of homopolymers.

EXAMPLE 4 (COMPARATIVE)

This example illustrates preparation of a homopolymer of ethylene under conditions similar to those used for examples 1 to 3 for subsequent comparison with the copolymers. The polymerization was conducted in a high pressure reactor at a pressure of 27,000 psi ($1.86 \times 10^8$ Pascals) and a temperature of 180° C. Ethylene was fed at a rate of 25 lb/hr. The polymerization was conducted in the presence of 0.5 vol % PDC in odorless mineral spirits, as a free radical initiator and 1.25 lb/hr acetone as a telogen. Under these conditions, polymer was produced at an average rate of 2.4 lb/hr.

Polymer states were collected each hour over a total of 13 hours. Three of the states prepared under similar level conditions were combined and ground, blended well and dried in a vacuum oven at 50° C., for approximately 24 hrs, yielding 8.0 lbs. of off-white polymer. The polymer had a melt index of 6.3 g/10 min, a DSC melting point of 118.1° C., and a heat of fusion of 148.4 J/g. By GPC, the polymer $M_w$ was approximately 88,000.

EXAMPLE 5

This example illustrates the production of an E/Y/M copolymer of ethylene and 4-hydroxystyrene by transesterification.

The copolymer of example 2 (10.01 g) was dissolved in tetrahydrofuran (125 ml, THF) while stirring and heating to reflux. A few particles were still visible in the mixture, indicating the copolymer was mostly, but not completely, dissolved. Sodium methoxide in methanol (0.108 g of 25 wt % solution, 6.2 mole % sodium methoxide based on 4-acetoxystyrene in copolymer) was blended with methanol (1.213 g) and added dropwise to the THF solution. Stirring and refluxing was continued for 4 hours while distillate was collected in a Dean-Stark trap. Upon cooling the polymer precipitated. Excess solvent was decanted, and the solid dried in the hood, and then in a vacuum oven (15 in Hg, $5.05 \times 10^4$ Pascals, 70° C.) overnight to provide the polymer (8.91 g, 92.1%). FTIR of a 0.95 mil thick pressed film of the sample exhibited a broad hydroxyl band centered at 3370 $cm^{-1}$ but no band at 1770 $cm^{-1}$ band arising from acetoxy carbonyl, confirming complete transesterification to the E/Y/M copolymer.

EXAMPLE 6-7

These examples illustrate the improved adhesion between a copolymer of the invention and common polar substrates, as compared to an ethylene homopolymer made by the same process.

The E/X/M copolymer of example 5 and the homopolymer of example 4 were each pressed into 12.7 cm×12.7 cm, approximately 64 μm thick films in a lab press at 150° C. using a 3 min preheat, followed by 1 min at 20,000 psi ($1.38 \times 10^8$ Pascals), followed by slow cooling in the press. Three types of substrate films were also obtained or prepared: an oriented poly(ethylene terephthalate) film (Mylar® PET, 51 μm thick, E.I. du Pont de Nemours and Co., Wilmington, Del.); nylon 6 film (64 μm), prepared by melt pressing Ultramid® B3 resin (BASF Aktiengesellschaft, Ludwigschaffen, Germany) at 240° C.; and LCP 400 film (89 μm) prepared by melt extrusion of LCP 400 resin, a liquid crystalline polyester obtained from the E. I., du Pont de Nemours Company, as described in U.S. Patent Application Publication 2004/0058092, incorporated herein by reference.

Films of the polymers of examples 4 and 5 were laminated to each of the substrate films by bonding with a heat sealer over a 2.5 cm band. The heat seal conditions were 176° C. with a 2 second dwell time. Five 1.3 cm wide strips were then cut from each bonded sandwich for peel testing using method ASTM D 1876. The strips were conditioned in a 73° C., 50% RH room for at least 64 hours before testing. A T-peel test was conducted by placing the film ends away from the bonded section into the jaws of the INSTRON tester and pulling at a crosshead speed of 30.5 cm/min until the sample failed completely by debonding or tearing. The peel strength was taken as the average stress achieved while the sample was fully under load. The results of the peel strength tests are summarized in Table 1. The peel strength values in the table are the averages of measurements on multiple samples.

TABLE 1

Results of Peel Strength Measurements

| Example | Polymer | Substrate | Peel Strength g/cm |
|---|---|---|---|
| Example 6 | E/Y/M of Ex. 5 | Nylon 6 | 114.8 |
| | " | Mylar ® PET | 40.2 |
| | " | LCP 400 | 335.4 |
| Example 7, Comparative | Polyethylene of Ex. 4 | Nylon 6 | 9.8 |
| | Polyethylene of Ex. 4 | Mylar ® PET | NB |
| | Polyethylene of Ex. 4 | LCP 400 | NB |

NB = no bonding between polyethylene and substrate films

The adhesion of polyethylene to these substrates was negligible. By contrast, the E/Y/M copolymer comprising ethylene and 4-hydroxystyrene of Example 5 had significant adhesion to these three substrates, and especially to nylon 6 and LCP 400.

What is claimed is:

1. A random copolymer consisting of:
    (a) 1.0 mol % to 20 mol % 4-hydroxystyrene;
    (b) 0 mol % to 40 mol % one or more comonomers selected from the group consisting of: vinyl acetate, alkyl (meth) acrylic esters, acrylonitrile, maleic acid diesters, (meth) acrylic acids, maleic acid, maleic acid monoester, itaconic acid, fumaric acid, fumaric acid monoesters, glycidyl acrylate, glycidyl methacrylate, and glycidyl vinyl ether; and
    (c) 40 mol % to 99 mol % ethylene;
    wherein the total mol % of (a)-(c) is 100 mol % and the random copolymer has a melt index of 0.15 g/10 min to about 100 g/10 min as determined by ASTM method #D1238, condition 190/2.

2. The random copolymer of claim 1 wherein (b) is 0 mol % of the random copolymer.

3. The random copolymer of claim 1 wherein (a) is about 1 to about 12 mol % of the random copolymer.

4. The random copolymer of claim 1 wherein (b) is 1 to 20 mol % of the random copolymer and selected from the group consisting of: vinyl acetate and alkyl (meth)acrylic esters.

* * * * *

UNITED STATES PATENT AND TRADEMARK OFFICE
CERTIFICATE OF CORRECTION

PATENT NO. : 7,534,837 B2
APPLICATION NO. : 11/235300
DATED : May 19, 2009
INVENTOR(S) : Michael Thomas Sheehan et al.

It is certified that error appears in the above-identified patent and that said Letters Patent is hereby corrected as shown below:

Column 1, lines 31-32, "4-hydroxysytrene" should read --4-hydroxystyrene--
Column 2, line 54, "acid fumaric acid" should read --acid, fumaric acid--
Column 2, line 67, "maleicacid" should read --maleic acid--
Column 3, line 1, "fumauic acid" should read --fumaric acid--
Column 6, line 25, "non-hydrolytic solvent" should read --nonhydroxylic solvent--
Column 7, line 7, "4-acetoxysytrene" should read --4-acetoxystyrene--
Column 7, line 14, "Include" should read --include--
Column 7, line 53, "feed back" should read --feedback--
Column 9, line 42, "E/X/M copolymer" should read --E/Y/M copolymer--

Signed and Sealed this

Seventh Day of September, 2010

David J. Kappos
*Director of the United States Patent and Trademark Office*